(12) United States Patent
Gibbs et al.

(10) Patent No.: US 7,311,567 B2
(45) Date of Patent: Dec. 25, 2007

(54) AMPHIBIOUS VEHICLE

(75) Inventors: Alan Timothy Gibbs, London (GB); Neil Graham Jenkins, Atherstone (GB)

(73) Assignee: Gibbs Technologies Ltd, Warwickshire (GB)

( * ) Notice: Subject to any disclaimer, the term of this patent is extended or adjusted under 35 U.S.C. 154(b) by 0 days.

(21) Appl. No.: 11/255,582

(22) Filed: Oct. 21, 2005

(65) Prior Publication Data

US 2006/0172627 A1   Aug. 3, 2006

(30) Foreign Application Priority Data

Oct. 22, 2004  (GB)  .................. 0423463.9
Oct. 22, 2004  (GB)  .................. 0423470.4
Oct. 22, 2004  (GB)  .................. 0423474.6
Oct. 22, 2004  (GB)  .................. 0423483.7
Oct. 22, 2004  (GB)  .................. 0423517.2

(51) Int. Cl.
*B60F 3/00* (2006.01)

(52) U.S. Cl. ........................................ 440/12.5
(58) Field of Classification Search ............. 440/12.5
See application file for complete search history.

(56) References Cited

U.S. PATENT DOCUMENTS

| 2,400,132 | A |   | 5/1946  | Porter |
| 4,387,661 | A |   | 6/1983  | Duff |
| 4,744,324 | A |   | 5/1988  | Martinmaas |
| 5,690,046 | A |   | 11/1997 | Grzech, Jr. |
| 6,182,784 | B1 |  | 2/2001  | Pestotnik |
| 6,505,694 | B2 | * | 1/2003 | Maguire ................ 180/90.1 |
| 6,540,569 | B1 |  | 4/2003  | Gong |
| 6,672,916 | B1 |  | 1/2004  | Lent-Phillips et al. |

FOREIGN PATENT DOCUMENTS

| JP |    | 2002/124308 | 5/2002 |
| WO | WO | 2004/020228 A1 | 7/2004 |

* cited by examiner

*Primary Examiner*—Stephen Avila
(74) *Attorney, Agent, or Firm*—Fulwider Patton LLP

(57) ABSTRACT

A planing amphibious vehicle with retractable wheels and a sit-astride seat having dimensions that impart enhanced capability in both land as well as water modes of operation. The beam, track, dead rise angle and the location of the handlebars cooperate to enhance freeboard and ground clearance without sacrificing manoeuvrability. The length is at least 2400 mm; the beam is at least 1250 mm; the deadrise angle at least 10°; and the handlebars are located only slightly forward of the halfway distance from transom to bow.

34 Claims, 4 Drawing Sheets

AMPHIBIOUS VEHICLE

CROSS-REFERENCES TO RELATED APPLICATIONS

This application claims priority from Great Britain Application Serial Nos. 0423463.9, 0423470.4, 0423474.6, 0423483.7, and 0423517.2, all filed Oct. 22, 2004.

BACKGROUND OF THE INVENTION

The present invention relates to an amphibious vehicle and, in particular, to a vehicle which can function as an all-terrain vehicle "ATV" (sometimes called "a quadbike") on land and as personal watercraft "PWC" (sometimes called a "jetski" or a "wave runner") on water.

Known PWCs are all consistent in dimension and typically have a beam of 1.15 m-1.23 m, a length of 2.93 m-3.34 m and a planing hull with a maximum dead rise angle of less than 9°.

Known ATVs are also consistent in dimension and have a maximum track width of 1220 mm (and typically have a track width of around 1150 mm) and a maximum length of 2085 mm (and typically a length of around 1850 mm).

In the past the creators of amphibious vehicles have either adapted existing PWC designs to provide limited land mode capability or have adapted existing ATV designs to provide limited marine capabilities. For instance, in U.S. Pat. No. 5,690,046 of GRZECH a PWC design is adapted with the resulting vehicle have the same dimensions as a PWC, in particular the track width of the vehicle is kept within the beam of the hull and the dead rise of the hull is conventional.

SUMMARY OF THE INVENTION

The present invention provides in a first aspect an amphibious vehicle comprising:
  a sit-astride seat;
  a planing hull;
  at least four wheels, all of which are movable between a lowered ground-engaging land mode location and a raised water mode location, two of the four wheels being front steerable wheels which are, at least in the land mode of vehicle, connected to handlebars which can be operated by the driver to steer the vehicle;
  an engine which in the land mode of the vehicle is connected to at least one of the wheels to drive the wheel; and
  marine propulsion means to propel the vehicle in water; wherein the hull has a beam of at least 1250 mm.

The unique beam of the vehicle, larger than for a conventional PWC gives a vehicle with sufficient displacement to give adequate freeboard on water while also allowing sufficient ground clearance for land use off-road.

The present invention provides in a second aspect an amphibious vehicle comprising:
  a sit-astride seat;
  a planing hull
  at least four wheels, all of which are movable between a lowered ground-engaging land mode location and a raised water mode location, two of the four wheels being front steerable wheels which are, at least in the land mode of vehicle, connected to handlebars which can be operated by the driver to steer the vehicle;
  an engine which in the land mode of the vehicle is connected to at least one of the wheels to drive the wheel; and
  marine propulsion means to propel the vehicle in water; wherein
  the front steerable wheels are spaced apart by an outer track of at least 50 mm greater than a beam of the hull.

The applicant has adopted an approach of having four wheels, mounted on suspension arms which place them at a track width outside the beam of the hull when in land mode; this gives good land mode operation including off-road land mode operation. Since the suspension arms extend through the hull the effective planing area of the hull is reduced and so the beam must be chosen with a certain minimum. The track width of the vehicle is then at a width much greater than that conventionally chosen for ATVs. The vehicle of the present invention is uniquely dimensioned and this provides a vehicle which is both capable on land and on water.

The present invention provides in a third aspect an amphibious vehicle comprising:
  a sit-astride seat;
  a planing hull;
  at least four wheels, all of which are movable between a lowered ground-engaging land mode location and a raised water mode location, two of the four wheels being front steerable wheels which are, at least in the land mode of vehicle, connected to handlebars which can be operated by the driver to steer the vehicle;
  an engine which in the land mode of the vehicle is connected to at least one of the wheels to drive the wheel; and
  marine propulsion means to propel the vehicle in water; wherein
  a planing surface of the planing hull has a dead rise angle of above 10°.

The vehicle has a planing surface with a dead rise angle unusually high for a planing PWC; this keeps the vehicle manoeuvrable despite a wide beam.

The present invention provides in a fourth aspect an amphibious vehicle comprising:
  a sit-astride seat;
  a planing hull;
  at least four wheels, all of which are movable between a lowered ground-engaging land mode location and a raised water mode location, two of the four wheels being front steerable wheels which are, at least in the land mode of vehicle, connected to handlebars which can be operated by the driver to steer the vehicle;
  an engine which in the land mode of the vehicle is connected to at least one of the wheels to drive the wheel; and
  marine propulsion means to propel the vehicle in water; wherein
  the vehicle has a length L and the handlebars are located between 0.5L and 0.63L along the vehicle length as measured from the transom to the bow.

The handlebars are far nearer the stern/rear of the vehicle than is normal in a PWC or a ATV. This gives good handling on water and land for a vehicle somewhat heavier than a usual PWC or ATV.

The handlebars of the ATV are typically located near the very front of the vehicle. The handlebars of a PWC are typically located two thirds of the way along the vehicle (measured from the stern). The applicant has realised that for manoeuvrability both on land and water the handlebars are best placed about half way along the vehicle (as measured from the transom). The enclosed volume in front of the vehicle gives buoyancy to the vehicle on water and also allows for the front wheels to be at least partly enclosed when retracted (which helps the aerodynamics of the vehicle) and further allows for a vehicle cooling system to have a forwardly located radiator, i.e. an air/water heat exchanger; such a radiator is not needed by a PWC and the radiator located in front of the engine in an ATV (this being a position exposed to air flow in an ATV).

These and other features and advantages of the present invention will become apparent from the following detailed description of preferred embodiments which, taken in conjunction with the accompanying drawings, illustrate by way of example the principles of the invention.

DETAILED DESCRIPTION OF THE PREFERRED EMBODIMENTS

Figure 1:
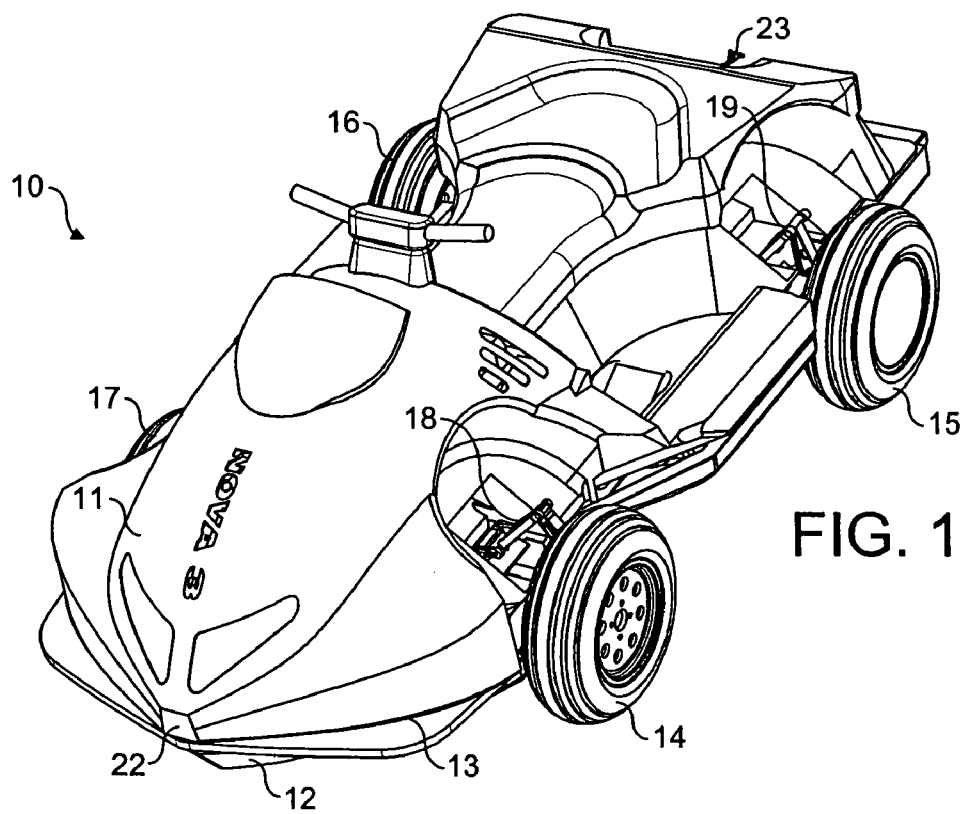
FIG. 1 is a perspective view from above of an amphibious vehicle according to the present invention.
Figure 2:
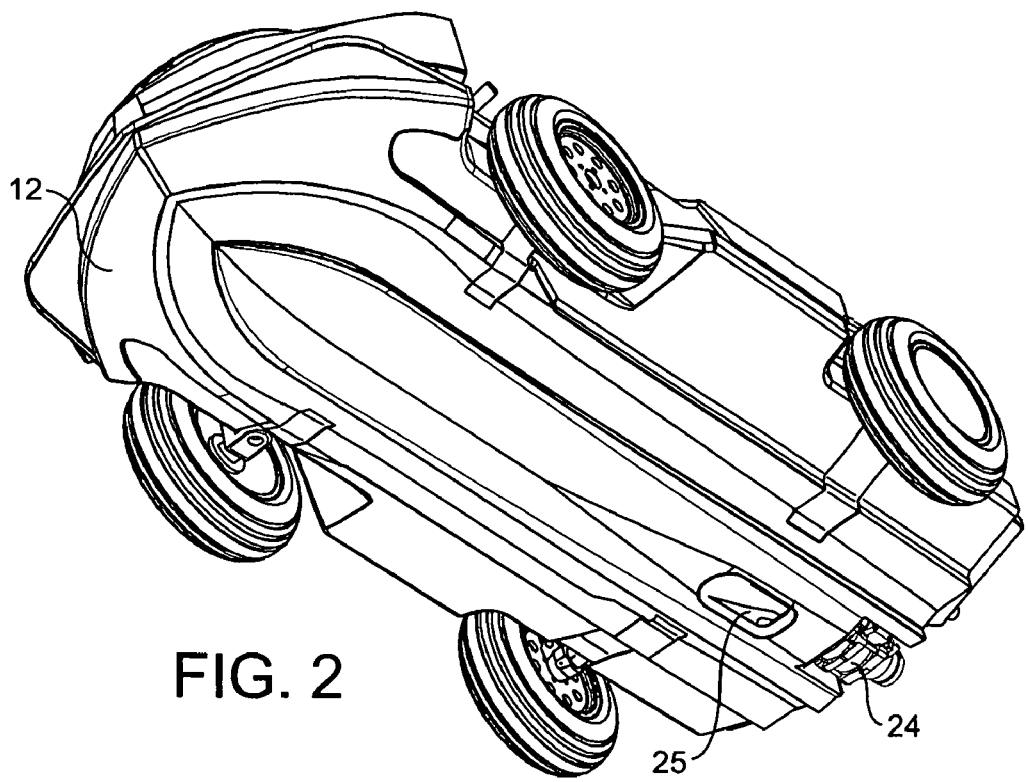
FIG. 2 is a perspective view from below of the vehicle of FIG. 1.
Figure 8:
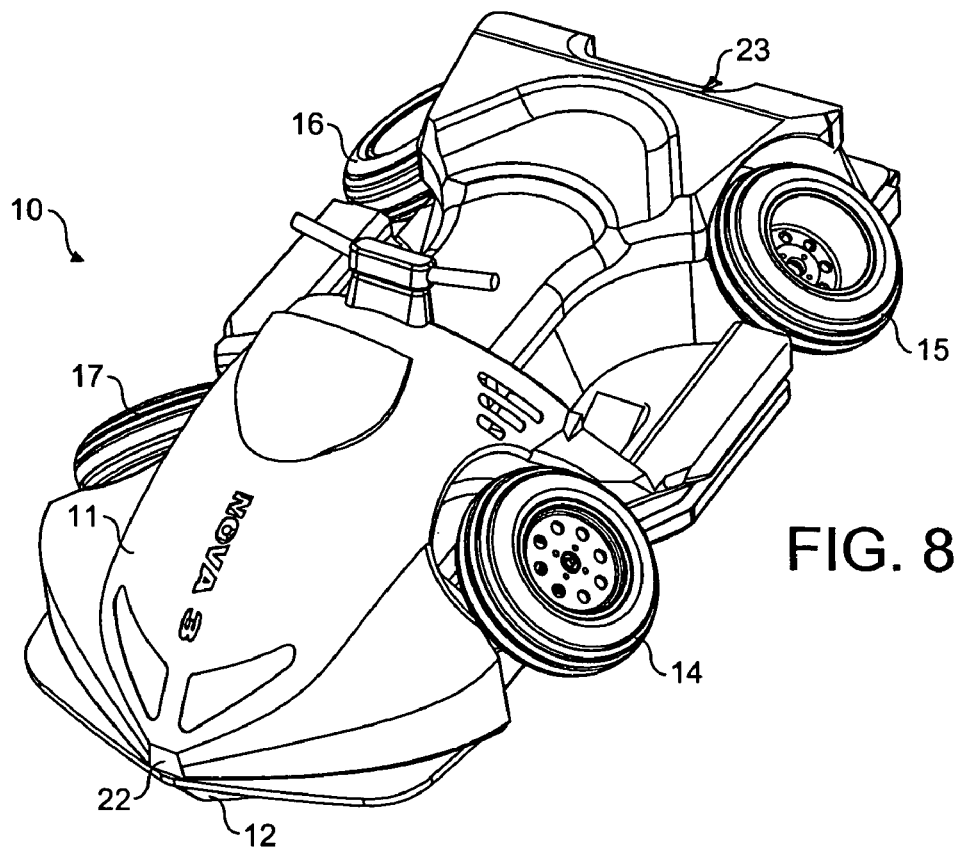
FIG. 8 is the same perspective view as FIG. 1, but with the vehicle's wheels in raised positions.
Figure 9:
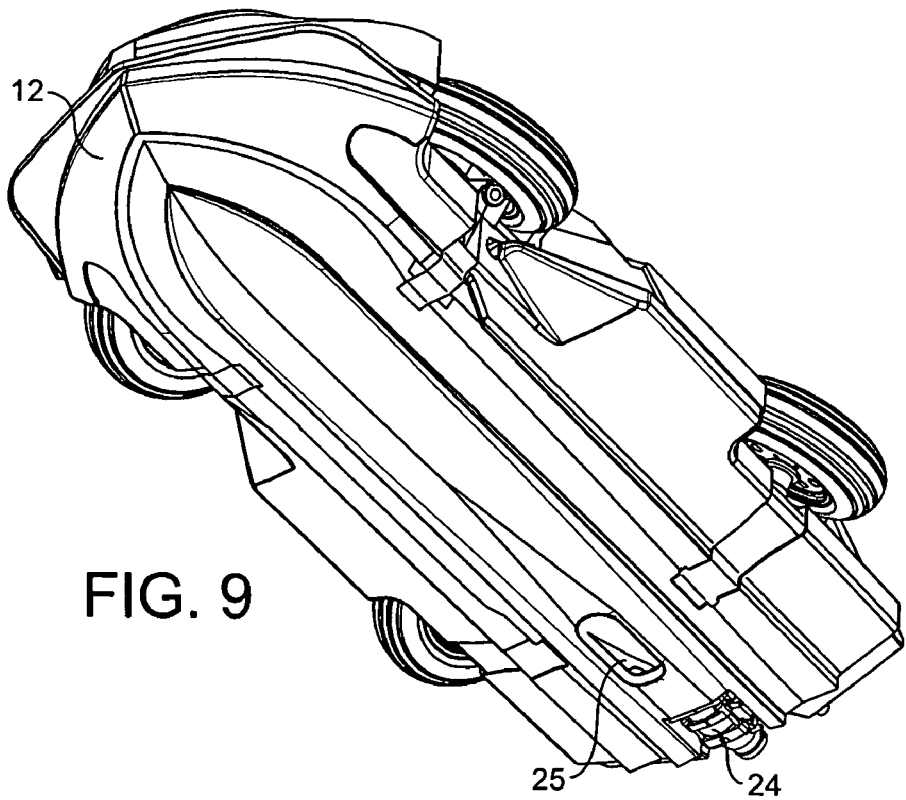
FIG. 9 is the same perspective view as FIG. 2, but with the vehicle's wheels in raised positions.

FIG. 1 shows an amphibious vehicle 10 having a body formed from a deck panel 11 and a hull 12 which are joined at a join line 13. The vehicle has four wheels 14,15,16,17 which are each rotatable for wheel retraction about an axis running longitudinally fore and aft along the vehicle 10. A retraction mechanism can rotate the suspension arms 18,19, 20,21 to thereby rotate the wheels 14,15,16,17 to retracted positions (see FIGS. 8,9) for marine use.

The vehicle has a bow 22 and a stern 23. A jet drive 24 powers the vehicle on water, an inter 25 being provided in the hull 12. The rear wheels 15,16 of the vehicle are driven.

Figure 3:
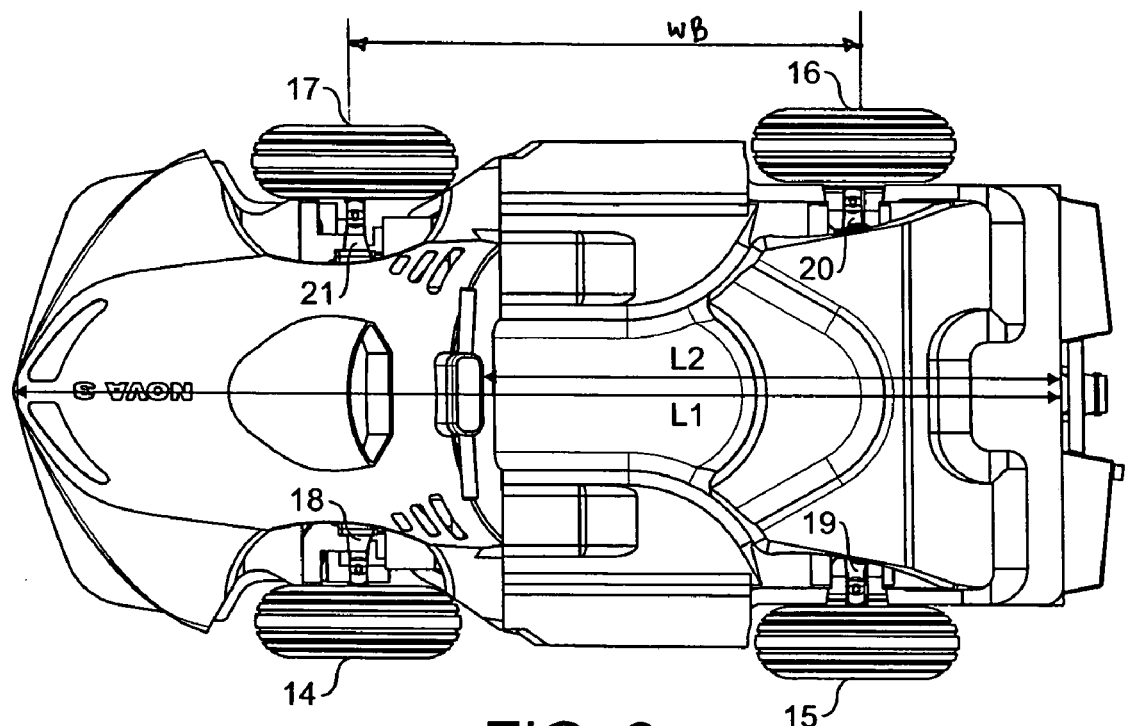
FIG. 3 is a plan view from above of the vehicle of FIGS. 1 and 2.
Figure 4:
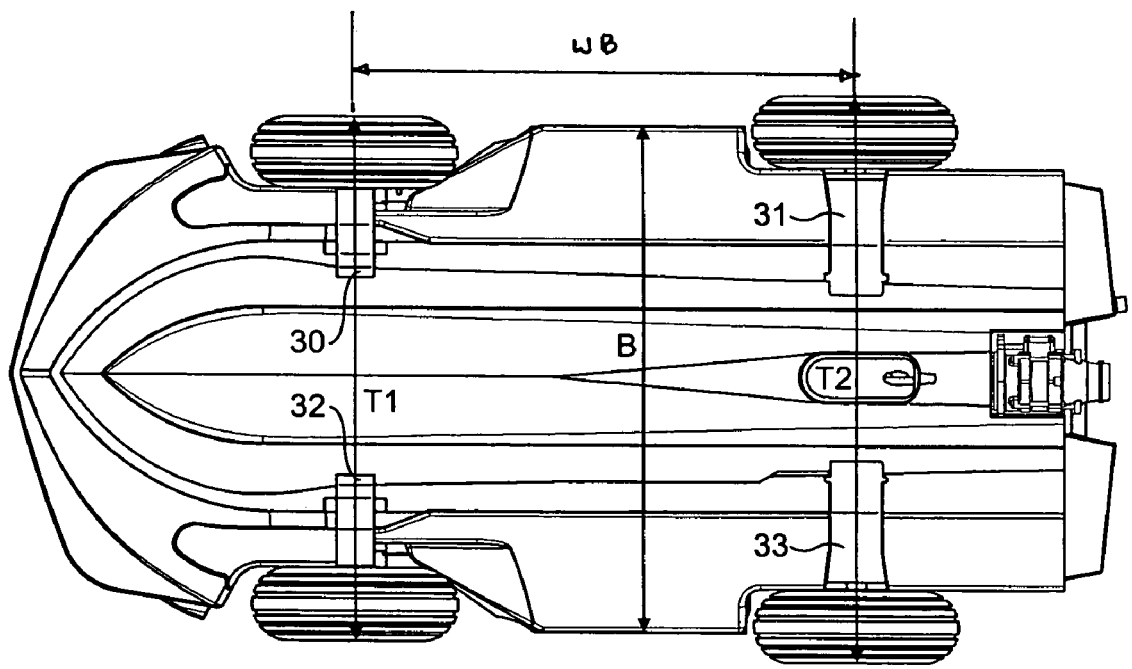
FIG. 4 is a plan view from below of the vehicle of FIGS. 1 to 3.
Figure 5:
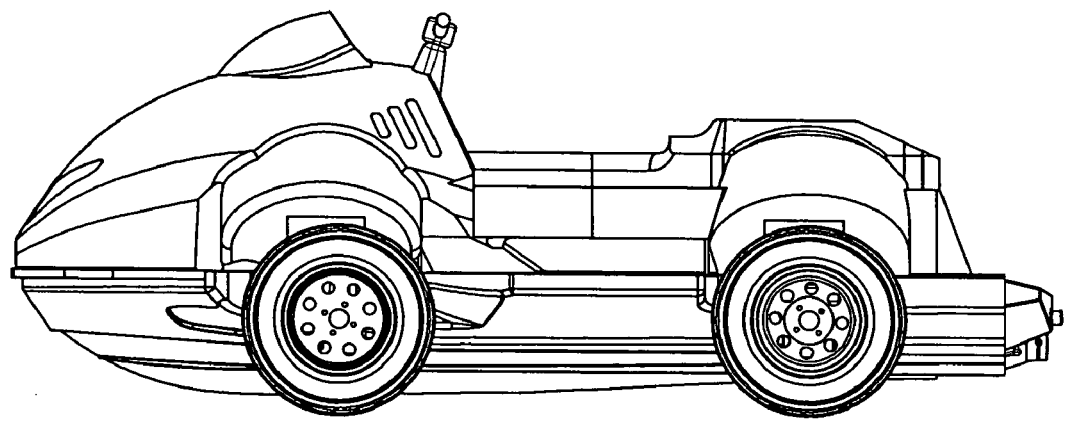
FIG. 5 is a side elevation view of the vehicle of FIGS. 1 to 4.

The wheels 14,15,15,17 are in land mode operation positioned at least in part outside the beam of the hull 12 (see FIGS. 3 and 4). The beam B is 1400 mm (this being the maximum beam of the vehicle) while the outer track width T1 of the front wheels (measured from one tyre's outer extremity to the other tyre's outer extremity) is 1500 mm and the outer track width T2 of the rear wheels is 1600 mm. The track width T2 is greater than the track width T1; the front wheels are connected to their wheel hubs in a different orientation to the rear wheels to achieve at least part of this difference. The track width T1 and T2 give good stability in land use. The track width T1 is smaller to allow for easier steering of the front wheels and a tighter turning circle.

The vehicle has an overall length of 3050 mm. A length of from about 2400 mm to about 3050 mm has been found to be most advantageous for amphibious applications as such length provides for adequate planing area for waterborne operation without being overly large for use on land.

The vehicle has an overall length L1 of 3050 mm as measured from the transom and a relatively short wheelbase WB of 1380 mm, and optionally up to about 1500 mm. This corresponds to a ratio of the wheelbase to the overall length of between about 48% and 53%. While such ratio sacrifices approach and departure angles, improvement gained in terms of breakover angle and hydrodynamic bow shape have been found to most advantageous for amphibious applications.

The beam choice is important for several reasons. First, the vehicle should have a reasonable amount of freeboard when afloat. The vehicle is heavier than a PWC and so would sit deeper in the water if of the same beam. On land the vehicle needs a certain ground clearance which dictates that the draft should not be increased. Hence ensuring that the beam is above 1250 mm ensures that sufficient displacement is achieved whilst achieving adequate freeboard and whilst achieving adequate ground clearance. Secondly, the need for rotating suspension arms means that the hull surface is not uninterrupted; instead apertures must be provided through which the suspension arms rotate. Covers 30,31,32,33 rotatable with the suspension arms are provided which at least in part cover the aperture when the wheels are retracted. However the planing area of the hull is nevertheless somewhat reduced and the beam must be adequate to provide for sufficient planing area that the vehicle can rise on the plane easily.

Figure 7:
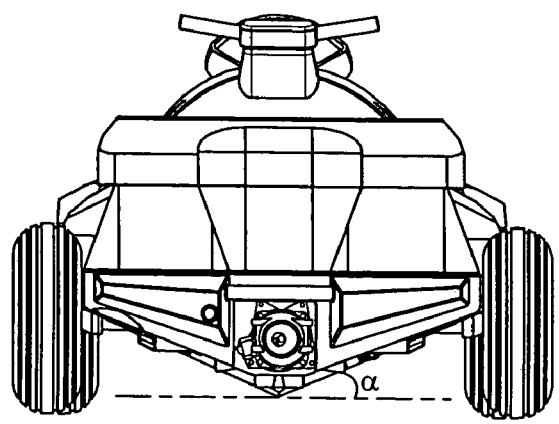
FIG. 7 is a rear elevation view of the vehicle of FIGS. 1 to 6.

The unusually wide beam of the vehicle dictates against the use of a shallow dead rise angle for the planing area of the vehicle. In PWCs the dead rise angles of the planing surfaces are typically below 9°. In contrast the dead rise angle $\alpha$ of the vehicle is consistently 20.7° along the centre line (see FIG. 7) in a planing surface of the vehicle. This resists the vehicle planing transversely when cornering on water, which would be a problem due to wide beam otherwise. Angles above 15° are preferred.

The overall length L1 of the vehicle is 3050 mm, whilst the length L2 to of the handlebars (measured from the transom) is 1634 mm; thus the handlebars are located 0.55 along the length of the vehicle. In PWCs usually the handlebars are at least 0.6 L along their length and in ATVs the handlebars are usually at least 0.66 L along their length. The positioning of the handlebars is unusual so as to position the driver in a location on the vehicle which meets the requirements of manoeuvrability on land and on water while also positioning the driver in a location to give good weight distribution to assist the vehicle getting on to the plane on water. Furthermore the bow part of the vehicle in front of the handlebars gives extra displacement to ensure good freeboard and allow the positioning of a radiator (an air/water heat exchanger) in front of the handlebars in a good position for airflow. The part of the vehicle body in front of the handlebars also allows the front wheels to be partly enclosed when retracted and this assists the aerodynamics of the vehicle.

Figure 6:
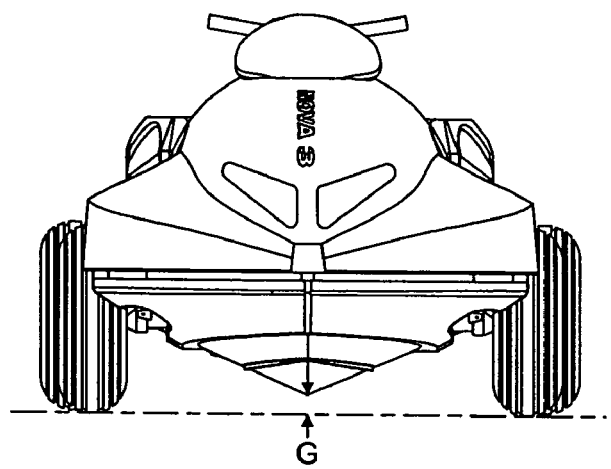
FIG. 6 is a front elevation view of the vehicle of FIGS. 1 to 5.

The minimum ground clearance of the vehicle on land (see FIG. 6) is 220 mm.

The present invention proposes a vehicle with a unique set of dimensions. This stems from designing a vehicle for good capabilities both on land and water, rather than adapting existing PWC and ATV designs.

While a particular form of the present invention has been illustrated and described, it will also be apparent to those skilled in the art that various modifications can be made without departing from the spirit and scope of the invention. Accordingly, it is not intended that the invention be limited except by the appended claims.

What is claimed is:

1. An amphibious vehicle, comprising:
   a sit-astride seat;

a planing hull;
at least four wheels, all of which are movable between a lowered ground-engaging land mode location and a raised water mode location, two of the four wheels being front steerable wheels which are, at least in the land mode of vehicle, connected to handlebars which can be operated by the driver to steer the vehicle;
an engine which in the land mode of the vehicle is connected to at least one of the wheels to drive the wheel; and
marine propulsion means to propel the vehicle in water; wherein the hull has a beam of at least 1250 mm and wherein the front steerable wheels are spaced apart by an outer track width of at least 50 mm greater than the beam.

2. An amphibious vehicle as claimed in claim 1, wherein the other wheels of the said four wheels of the vehicle are rear wheels spaced apart by an outer a track width of at least 100 mm greater than the beam.

3. An amphibious vehicle as claimed in claim 1, wherein a planing surface of the planing hull has a dead rise angle of above 10°.

4. An amphibious vehicle as claimed in claim 1, wherein the vehicle has a length L from transom to bow and the handlebars are located at between about 0.5 L and about 0.63 L along the vehicle length, measured from the transom of the vehicle.

5. An amphibious vehicle as claimed in claim 1, wherein the hull has a beam of at least 1300 mm.

6. An amphibious vehicle as claimed in claim 1, wherein the hull has a beam of at least 1350 mm.

7. An amphibious vehicle as claimed in claim 1, wherein the hull has a beam of at least 1400 mm.

8. An amphibious vehicle, comprising
a sit-astride seat;
a planing hull;
at least four wheels, all of which are movable between a lowered ground-engaging land mode location and a raised water mode location, two of the four wheels being front steerable wheels which are, at least in the land mode of vehicle, connected to handlebars which can be operated by the driver to steer the vehicle;
an engine which in the land mode of the vehicle is connected to at least one of the wheels to drive the wheel; and
marine propulsion means to propel the vehicle in water; wherein
the front steerable wheels are spaced apart by an outer track width of at least 50 mm greater than a beam of the hull.

9. An amphibious vehicle as claimed in claim 8, wherein the other wheels of the said four wheels of the vehicle are rear wheels spaced apart by an outer track width of at least 100 mm greater than the beam.

10. An amphibious vehicle as claimed in claim 8, wherein a planing surface of the planing hull has a minimum dead rise angle of 10°.

11. An amphibious vehicle as claimed in claim 8, wherein the vehicle has a length L and the handlebars are located at between about 0.5 L and about 0.63 L along the vehicle length, measured from a stern of the vehicle.

12. An amphibious vehicle as claimed in claim 8, wherein the front steerable wheels are spaced apart by an outer track width of at least 100 mm greater than a beam of the hull.

13. An amphibious vehicle, comprising:
a sit-astride seat;
a planing hull;
at least four wheels, all of which are movable between a lowered ground-engaging land mode location and a raised water mode location, two of the four wheels being front steerable wheels which are, at least in the land mode of vehicle, connected to handlebars which can be operated by the driver to steer the vehicle;
an engine which in the land mode of the vehicle is connected to at least one of the wheels to drive the wheel; and
marine propulsion means to propel the vehicle in water; wherein:
a planing surface of the planing hull has a dead rise angle of above 10°.

14. An amphibious vehicle as claimed in claim 13, wherein the vehicle has a length L and the handlebars are located at between about 0.5 L and about 0.63 L along the vehicle length.

15. An amphibious vehicle as claimed in claim 13, wherein the planing surface has a dead rise angle of above 15°.

16. An amphibious vehicle as claimed in claim 13, wherein the planing surface has a dead rise angle of above 17.5°.

17. An amphibious vehicle as claimed in claim 13, wherein the planing surface has a dead rise angle of above 20°.

18. An amphibious vehicle, comprising:
a sit-astride seat;
a planing hull;
at least four wheels, all of which are movable between a lowered ground-engaging land mode location and a raised water mode location, two of the four wheels being front steerable wheels which are, at least in the land mode of vehicle, connected to handlebars which can be operated by the driver to steer the vehicle;
an engine which in the land mode of the vehicle is connected to at least one of the wheels to drive the wheel; and
marine propulsion means to propel the vehicle in water; wherein
the vehicle has a length L and the handlebars are located between about 0.5 L and about 0.63 L along the vehicle length.

19. An amphibious vehicle as claimed in claim 18, wherein the handlebars are located between 0.55 L and 0.61 L along the vehicle length.

20. An amphibious vehicle, comprising:
a sit-astride seat;
a planing hull;
at least four wheels, all of which are movable between a lowered ground-engaging land mode location and a raised water mode location, two of the four wheels being front steerable wheels which are, at least in the land mode of vehicle, connected to handlebars which can be operated by the driver to steer the vehicle;
an engine which in the land mode of the vehicle is connected to at least one of the wheels to drive the wheel; and
marine propulsion means to propel the vehicle in water; wherein
the vehicle has a length L and a wheelbase WB wherein the ratio of WB/L falls between about 0.48 and 0.53.

21. An amphibious vehicle, comprising:
a sit-astride seat;
a planing hull;
at least four wheels, all of which are movable between a lowered ground-engaging land mode location and a raised water mode location, two of the four wheels being front steerable wheels which are, at least in the land mode of vehicle, connected to handlebars which can be operated by the driver to steer the vehicle;

an engine which in the land mode of the vehicle is connected to at least one of the wheels to drive the wheel; and marine propulsion means to propel the vehicle in water; wherein the hull has a beam of at least 1250 mm and wherein a planing surface of the planing hull has a dead rise angle of above 10°.

22. An amphibious vehicle as claimed in claim 21, wherein the front steerable wheels are spaced apart by an outer track width of at least 50 mm greater than the beam.

23. An amphibious vehicle as claimed in claim 22, wherein the other wheels of the said four wheels of the vehicle are rear wheels spaced apart by an outer a track width of at least 100 mm greater than the beam.

24. An amphibious vehicle as claimed in claim 21, wherein the vehicle has a length L from transom to bow and the handlebars are located at between about 0.5 L and about 0.63 L along the vehicle length, measured from the transom of the vehicle.

25. An amphibious vehicle as claimed in claim 21, wherein the hull has a beam of at least 1300 mm.

26. An amphibious vehicle as claimed in claim 21, wherein the hull has a beam of at least 1350 mm.

27. An amphibious vehicle as claimed in claim 21, wherein the hull has a beam of at least 1400 mm.

28. An amphibious vehicle, comprising:
a sit-astride seat;
a planing hull;
at least four wheels, all of which are movable between a lowered ground-engaging land mode location and a raised water mode location, two of the four wheels being front steerable wheels which are, at least in the land mode of vehicle, connected to handlebars which can be operated by the driver to steer the vehicle;

an engine which in the land mode of the vehicle is connected to at least one of the wheels to drive the wheel; and marine propulsion means to propel the vehicle in water; wherein the hull has a beam of at least 1250 mm and wherein the vehicle has a length L from transom to bow and the handlebars are located at between about 0.5 L and about 0.63 L along the vehicle length, measured from the transom of the vehicle.

29. An amphibious vehicle as claimed in claim 28, wherein the front steerable wheels are spaced apart by an outer track width of at least 50 mm greater than the beam.

30. An amphibious vehicle as claimed in claim 29, wherein the other wheels of the said four wheels of the vehicle are rear wheels spaced apart by an outer a track width of at least 100 mm greater than the beam.

31. An amphibious vehicle as claimed in claim 28, wherein a planing surface of the planing hull has a dead rise angle of above 10°.

32. An amphibious vehicle as claimed in claim 28, wherein the hull has a beam of at least 1300 mm.

33. An amphibious vehicle as claimed in claim 28, wherein the hull has a beam of at least 1350 mm.

34. An amphibious vehicle as claimed in claim 28, wherein the hull has a beam of at least 1400 mm.

* * * * *

UNITED STATES PATENT AND TRADEMARK OFFICE
CERTIFICATE OF CORRECTION

PATENT NO. : 7,311,567 B2
APPLICATION NO. : 11/255582
DATED : December 25, 2007
INVENTOR(S) : Alan Timothy Gibbs et al.

It is certified that error appears in the above-identified patent and that said Letters Patent is hereby corrected as shown below:

Column 1, line 30, delete "have" and insert --having--.

Column 4, line 5, delete "found to most" and insert --found to be most--.

Column 4, line 35, after "L2 to" delete "of".

Column 7, line 17, delete "outer a track" and insert --outer track--.

Column 8, line 21, delete "outer a track" and insert --outer track--.

Signed and Sealed this

Eighth Day of July, 2008

JON W. DUDAS
*Director of the United States Patent and Trademark Office*